(12) United States Patent
Huang et al.

(10) Patent No.: US 7,888,880 B2
(45) Date of Patent: Feb. 15, 2011

(54) DIELECTRIC BARRIER DISCHARGE LAMP SYSTEM AND DRIVING METHOD THEREOF HAVING RELATIVELY BETTER PERFORMANCE IN STARTUP AND RE-STARTUP OF DIMMING

(75) Inventors: Qiukai Huang, Shanghai (CN);
Qingyuan Meng, Shanghai (CN);
Jianping Ying, Shanghai (CN);
Jin-Chyuan Hung, Taoyuan Hsien (TW); Yui Shin Fran, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 593 days.

(21) Appl. No.: 11/923,995

(22) Filed: Oct. 25, 2007

(65) Prior Publication Data
US 2008/0303448 A1 Dec. 11, 2008

(30) Foreign Application Priority Data
Jun. 7, 2007 (TW) .............................. 96120605 A

(51) Int. Cl.
*H05B 41/16* (2006.01)
(52) U.S. Cl. ........................ 315/274; 315/247; 315/224; 315/209 R; 315/291

(58) Field of Classification Search ............. 315/209 R, 315/219, 224, 225, 291, 307, DIG. 2, DIG. 5, 315/DIG. 7, 246, 247, 274–280
See application file for complete search history.

(56) References Cited

U.S. PATENT DOCUMENTS

| 7,339,330 B2 * | 3/2008 | Brates et al. ................. 315/289 |
| 2005/0088111 A1 * | 4/2005 | Hung .......................... 315/224 |

* cited by examiner

*Primary Examiner*—Tuyet Thi Vo
(74) *Attorney, Agent, or Firm*—Volpe and Koenig, PC

(57) ABSTRACT

The configurations of a dielectric barrier discharge lamp (DBDL) system and the driving method thereof are provided in the present invention. The proposed DBDL system includes a driver circuit receiving a DC input voltage and generating an AC output voltage, including a transformer having a primary winding and a secondary winding, a dielectric barrier discharge lamp coupled to the secondary winding and a burst mode dimming circuit including a first switch. In which, the first switch is turned on when the first switch is starting such that the first switch and the primary winding forms a conducting path so as to apply a driving high voltage to the DBDEL and turn off the first switch after the DBDL is breaking through by the driving high voltage such that a driving normal voltage is applied to the DBDL.

8 Claims, 16 Drawing Sheets

DIELECTRIC BARRIER DISCHARGE LAMP SYSTEM AND DRIVING METHOD THEREOF HAVING RELATIVELY BETTER PERFORMANCE IN STARTUP AND RE-STARTUP OF DIMMING

FIELD OF THE INVENTION

The present invention relates to a dielectric barrier discharge lamp (DBDL) system and the driving method thereof. The provided DBDL system could solve the blinking light problem during the burst mode dimming process the DBDL (e.g., a flat fluorescent lamp: FFL).

BACKGROUND OF THE INVENTION

FFL is a new type of light source. It possesses the advantages of containing no mercury and relatively having low-profile, long life-span, better uniform brightness and broader operating temperature range etc. It is mainly applied to the backlight systems, the flat lighting and outdoors etc. The FFL is one kind of DBDL. During the driving process of the FFL, there are electrical charges accumulated on an isolation layer to form the reverse potential (the wall voltage) against the driving voltage so as to stop the continuation of the discharging due to the existence of the isolation layer. Therefore, the polarities of the driving voltage have to be changed continuously to maintain the charging and discharging.

Under the aforementioned circumstances and among all the tryouts for driving the FFL, the half-bridge driver circuit is relatively quite effective in driving the FFL. The half-bridge driver circuit includes two switches (SA and SB) and generates stable square wave outputs via alternately turning on, turning off and continuously switching of SA and SB (as shown in FIG. 1). The square wave voltage is amplified via a transformer and is converted into a high voltage square wave for applying to the FFL so as to effectively drive the FFL. In which, $T_{dimming}$ is the dimming period, $T_{ON}$ is the turn-on time of the burst mode, and $T_{OFF}$ is the turn-off time of the burst mode.

This kind of stable square wave is ideal for the stable operation of the FFL, but it can not effectively handle the problems such as the startup and the repeated re-lighting in the burst mode dimming. It is because the ionization level in the plasma is relatively lower then, and the wall voltage existed on the isolation layer is not high enough relative to that in stable operation. This causes the problem of relatively harder startup and the light blinking problem in the dimming operations. The light blinking problem becomes serious especially when the dimming value is relatively lower, which makes the dimming value of the FFL has to be higher than around 20%.

The relatively lower dimming value makes the turn-off time of the burst mode relatively longer. The longer off time makes the combination of the positive ions and the negative ions of the plasma more complete, which makes the re-lighting problem of the FFL become even more difficult. Under such a circumstance, the FFL usually needs five to six driving periods to be lit up totally. When the FFL is not totally lit up under such a driving situation, the light blinking phenomenon of the FFL does occur, and the light blinking problem will get worse when the dimming value decrease.

As shown in the experiment of FIG. 2, the turn-on time of the burst mode is set at a fixed value (about 260 ns), and the turn-off time of the burst mode is set between 34 µs~2.5 ms. As shown by the results of this experiment, the shortened off time can not speed up the re-startup in the dimming operations. Therefore, decreasing the turn-off time of the dimming operation can not solve the re-lighting problem during the dimming. Namely, the re-lighting problem always occur no matter what dimming value is, human eyes can not identify it only at the time dimming value is relatively higher. That is to say, the higher the ratio of the not totally lit up part over the total turn-on time of the burst mode is, the more obvious the blinking light to the human eyes is. Otherwise, the re-lighting problem is not so obvious to the human eyes. According to the above-mentioned descriptions, increasing the turn-on time of the burst mode dimming and decreasing the time from the re-startup to the total light-up would diminish the occurrence of the blinking light.

Increasing the turn-on time of the burst mode at the same dimming value would relatively increase the dimming time period, that is to say the dimming frequency would be decreased. Since the dimming frequency can not be too low in real operation, this kind of dimming has a relatively larger limitation, a relatively smaller dimming range. A method, which employs the burst mode dimming and could decrease the blinking light, is needed.

Besides, the energy stored on the isolation layer of the FFL can not be properly released, and will generate the voltage oscillation waves having a frequency lower than the PWM driving frequency, and the energy stored on the FFL is transformed into heat via oscillations and being dissipated when the turn-off time of the burst mode arrives during the burst mode dimming as shown in FIG. 3. This voltage oscillation generates a relatively larger stress on the transformer, especially when the dimming value is relatively higher (the turn-off time of the burst mode is relatively shorter then). When the next driving period comes, and the voltage oscillation is not diminished yet, which will cause an even larger stress to the transformer, and result in a magnetic bias phenomenon. In the present invention, a method of releasing energy at the end of each turn-on time of the burst mode is employed to let the FFL generate self-discharging. In this way, not only the lighting effect of the FFL is increased, but also certain wall voltage is remain on the FFL after the discharging is ended, which will facilitate the next startup.

Keeping the drawbacks of the prior arts in mind, and employing experiments and research full-heartily and persistently, the applicant finally conceived a DBDL system and the driving method thereof having a relatively better performance in startup and re-startup of dimming.

SUMMARY OF THE INVENTION

It is therefore an object of the present invention to provide a DBDL system and the driving method thereof having a relatively better performance in startup and re-startup of dimming, which increase the startup speed via decreasing the startup time. Namely, let the DBDL reach the totally lit up status in a relatively short time. In the present invention, a method of increasing the starting voltage is employed to accomplish the quick startup. The concrete method of increasing the startup speed is to increase the driving voltage applied to the DBDL such that the DBDL is quickly breaking through and enters the totally lit up status. And then, restore the external driving voltage of the DBDL to a normal status. Being verified, this method is quite effective to the quick startup of the DBDL, the effects are more obvious especially during the dimming process, and could dramatically improve the blinking light problem under the relatively lower dimming value of the DBDL. The present invention elaborates a method of employing the burst mode dimming to apply a pulse higher than the normal operating voltage during the startup so as to decrease the blinking light and circuits to accomplish the increasing of the driving pulse voltage during the DBDL startup stage.

According to the first aspect of the present invention, a DBDL system includes a driver circuit receiving a DC input voltage for generating an AC output voltage and including a transformer having a primary winding and a secondary winding, a DBDL coupled to the secondary winding and a burst mode dimming circuit including a first switch, wherein the first switch is turned on when the DBDL is starting such that a conducting path is formed by the primary winding and the first switch so as to apply a first driving voltage to the DBDEL and the first switch is turned off when the DBDL is breaking through by the first driving voltage so as to apply a second driving voltage to the DBDEL.

Preferably, the first driving voltage is relatively higher than the second driving voltage, the second driving voltage is a normal operating voltage of the DBDL, the first switch is coupled to the primary winding, the burst mode dimming circuit further includes a second switch, and the driver circuit is a half-bridge driver circuit, including a third switch having a first terminal receiving the DC input voltage and a second terminal, a fourth switch having a first terminal coupled to the second terminal of the third switch and a second terminal coupled to a ground, a first capacitor having a first terminal coupled to the first terminal of the third switch and a second terminal, and a second capacitor having a first terminal coupled to the second terminal of the first capacitor and a second terminal coupled to the ground.

Preferably, each of the primary winding and the first and the second switches includes a first and a second terminals, the fourth switch further includes a body diode, the first terminal of the fourth switch is coupled to the first terminal of the primary winding, the second terminal of the second switch is coupled to the first terminal of the first switch and the second terminal of the primary winding, the second terminal of the first capacitor is coupled to the first terminal of the second switch, the conducting path further includes the turned on third switch, the first and the third switches are turned off and the second switch is turned on when the DBDL is breaking through by the first driving voltage, and subsequently the third and the fourth switches are turned on and turned off alternately so as to generate the AC output voltage, and the first switch is turned on and the second to the fourth switches are turned off such that the first switch, the primary winding and the body diode form a discharging loop to release a stored electronic energy of the DBDL when a turn-on time of a dimming period is ended.

Preferably, each of the primary winding and the first and the second switches includes a first and a second terminals, the third switch further includes a body diode, the first terminal of the fourth switch is coupled to the first terminal of the primary winding, the first terminal of the second switch is coupled to the second terminal of the first switch and the second terminal of the primary winding, the second terminal of the first capacitor is coupled to the second terminal of the second switch, the conducting path further includes the turned on fourth switch, the first and the fourth switches are turned off and the second switch is turned on when the DBDL is breaking through by the first driving voltage, and subsequently the third and the fourth switches are turned on and turned off alternately so as to generate the AC output voltage, and the first switch is turned on and the second to the fourth switches are turned off such that the first switch, the primary winding and the body diode form a discharging loop to release a stored electronic energy of the DBDL when a turn-on time of a dimming period is ended.

Preferably, each of the primary winding and the first and the second switches includes a first and a second terminals, the fourth switch further includes a body diode, the first terminal of the fourth switch is coupled to the first terminal of the primary winding, the burst mode dimming circuit further includes a fifth switch having a first and a second terminals, the second terminal of the second switch is coupled to the first terminal of the first switch, the second terminal of the fifth switch and the second terminal of the primary winding, the second terminal of the first capacitor is coupled to the first terminal of the second switch, the conducting path further includes the turned on third switch, the first and the fifth switches are turned off and the second switch is turned on when the DBDL is breaking through by the first driving voltage, and subsequently the two groups of switches formed by the first and the third switches and the fourth and the fifth switches are turned on and turned off alternately so as to generate the AC output voltage, and the first switch is turned on and the second to the fifth switches are turned off such that the first switch, the primary winding and the body diode form a discharging loop to release a stored electronic energy of the DBDL when a turn-on time of a dimming period is ended.

Preferably, the burst mode dimming circuit further includes a diode having an anode and a cathode and a third capacitor, each of the primary winding, the first and the second switches and the third capacitor includes a first and a second terminals, the anode of the diode is coupled to the first terminal of the second capacitor, the cathode of the diode is coupled to the first terminal of the third capacitor and the first terminal of the first switch, the second terminal of the third capacitor is coupled to the first terminal of the fourth switch and the second terminal of the second switch, the first terminal of the second switch is coupled to the second terminal of the first switch and the first terminal of the primary winding, the second terminal of the first capacitor is coupled to the second terminal of the primary winding, the fourth switch is turned on and the first to the third switches are turned off when the DBDL is starting such that a middle point potential of the first and the second capacitors charges the third capacitor via the diode and the fourth switch, and subsequently the first and the third switches are turned on and the second and the fourth switches are turned off such that the DC input voltage and a cross voltage of the third capacitor form the first driving voltage, the conducting path further includes the turned on third switch and the second and the third capacitors, the first and the third switches are turned off and the second and the fourth switches are turned on when the DBDL is breaking through by the first driving voltage, and subsequently the third and the fourth switches are turned on and turned off alternately so as to generate the AC output voltage, and the first switch is turned on and the second to the fourth switches are turned off such that the first switch, the primary winding and the diode form a discharging loop to release a stored electronic energy of the DBDL when a turn-on time of a dimming period is ended.

Preferably, the burst mode dimming circuit further includes a first and a second resistors, a diode has an anode and a cathode and a third and a fourth capacitors, each of the primary winding, the first and the second switches, the first and the second resistors and the third and the fourth capacitors includes a first and a second terminals, the first terminal of the first resistor is coupled to the first terminal of the first capacitor, the anode of the diode is coupled to the second terminal of the first resistor, the first terminal of the second resistor and the first terminal of the fourth capacitor, the second terminal of the second resistor and the second terminal of the fourth capacitor are coupled to the second terminal of the second capacitor, the cathode of the diode is coupled to the first terminal of the third capacitor and the first terminal of the first switch, the second terminal of the third capacitor is coupled to the first terminal of the fourth switch and the second terminal of the second switch, the first terminal of the second switch is coupled to the second terminal of the first switch and the first terminal of the primary winding, the second terminal of the first capacitor is coupled to the second terminal of the primary winding, the fourth switch is turned on and the first to the third switches are turned off when the DBDL is starting such that the DC input voltage charges the third capacitor via the first resistor, the diode and the fourth switch, and subsequently the first and the third switches are turned on and the second and the fourth switches are turned off such that the DC input voltage and a cross voltage of the third capacitor form the first driving voltage, the conducting path further includes the turned on third switch and the second and the third capacitors, the first and the third switches are turned off and the second and the fourth switches are turned on when the DBDL is breaking through by the first driving voltage, and subsequently the third and the fourth switches are turned on and turned off alternately so as to generate the AC output voltage, and the first switch is turned on and the second to the fourth switches are turned off such that the first switch, the primary winding, the first capacitor, the first resistor and the diode form a discharging loop to release a stored electronic energy of the DBDL when a turn-on time of a dimming period is ended.

Preferably, the primary winding includes a first winding having a first and a second terminals and a first central tap, and a second winding having a first and a second terminals, the first and the second windings are magnetically coupled, the first terminal of the first winding and the first terminal of the second winding have the opposite polarities and both receive the DC input voltage, the first switch has a first and a second terminals, the first terminal of the first switch is coupled to the first central tap, the second terminal of the first switch is coupled to a ground, and the driver circuit is a push-pull driver circuit and includes a second switch having a first terminal and a second terminal coupled to the ground and a third switch having a first terminal and a second terminal coupled to the ground.

Preferably, the first terminal of the third switch is coupled to the second terminal of the second winding, the third switch further includes a body diode, the push-pull driver circuit further includes a diode having an anode and a cathode, the anode of the diode is coupled to the second terminal of the first winding, the first terminal of the second switch is coupled to the cathode of the diode, the conducting path further includes the first winding and the first central tap, the first switch is turned off when the DBDL is breaking through by the first driving voltage, and subsequently the second and the third switches are turned on and turned off alternately so as to generate the AC output voltage, and the first switch is turned on and the second to the third switches are turned off such that the first winding, the first central tap, the first switch, the body diode and the second winding form a discharging loop to release a stored electronic energy of the DBDL when a turn-on time of a burst mode is ended.

Preferably, the first terminal of the third switch is coupled to the second terminal of the second winding, the third switch further includes a body diode, the push-pull driver circuit further includes a fourth switch having a first and a second terminals, the first terminal of the fourth switch is coupled to the first terminal of the second switch, the second terminal of the fourth switch is coupled to the second terminal of the first winding, the conducting path further includes the first wind-ing and the first central tap, the first and the fourth switches are turned off when the DBDL is breaking through by the first driving voltage, and subsequently the second and the third switches are turned on and turned off alternately so as to generate the AC output voltage, and the first switch is turned on and the second to the fourth switches are turned off such that the first winding, the first central tap, the first switch, the body diode and the second winding form a discharging loop to release a stored electronic energy of the DBDL when a turn-on time of a burst mode is ended.

Preferably, the first switch further includes a first body diode, the push-pull driver circuit further includes a fourth switch having a first and a second terminals and a second body diode, a first and a second diodes each of which has an anode and a cathode, the second winding further includes a second central tap, the first terminal of the fourth switch is coupled to the second central tap, the second terminal of the fourth switch is coupled to the ground, the anode of the first diode is coupled to the second terminal of the first winding, the cathode of the first diode is coupled to the first terminal of the second switch, the anode of the second diode is coupled to the second terminal of the second winding, the cathode of the second diode is coupled to the first terminal of the third switch, the first and the fourth switches are turned on and turned off alternately when the DBDL is starting, the first winding, the first central tap and the first switch form the conducting path when the first switch is turned on and the fourth switch is turned off, the second winding, the second central tap and the fourth switch form the conducting path when the first switch is turned off and the fourth switch is turned on, the first and the fourth switches are turned off when the DBDL is breaking through by the first driving voltage, and subsequently the second and the third switches are turned on and turned off alternately so as to generate the AC output voltage, and the system is in one of the first state that the first switch is turned on and the second to the fourth switches are turned off and the second state that the fourth switch is turned on and the first to the third switches are turned off so as to form one of a first discharging loop including the first winding, the first central tap, the first switch, the second body diode, the second central tap and the second winding and a second discharging loop including the second winding, the second central tap, the fourth switch, the first body diode, the first central tap and the first winding to release a stored electronic energy of the DBDL when a turn-on time of a burst mode is ended.

Preferably, the first switch further includes a first body diode, the push-pull driver circuit further includes a fourth switch having a first and a second terminals and a second body diode, and a fifth and a sixth switches each of which has a first and a second terminals, the second winding further includes a second central tap, the first terminal of the fourth switch is coupled to the second central tap, the second terminal of the fourth switch is coupled to the ground, the first terminal of the fifth switch is coupled to the first terminal of the second switch, the second terminal of the fifth switch is coupled to the second terminal of the first winding, the first terminal of the sixth switch is coupled to the first terminal of the third switch, the second terminal of the sixth switch is coupled to the second terminal of the second winding, the first and the fourth switches are turned on and turned off alternately when the DBDL is starting, the first winding, the first central tap and the first switch form the conducting path when the first switch is turned on and the fourth switch is turned off, the second winding, the second central tap and the fourth switch form the conducting path when the first switch is turned off and the fourth switch is turned on, the first and the fourth switches are turned off when the DBDL is breaking through by the first driving voltage, and subsequently the second and the third switches are turned on and turned off alternately so as to generate the AC output voltage, and the system is in one of the first state that the first switch is turned on and the second to the sixth switches are turned off and the second state that the fourth switch is turned on and the first to the third and the fifth to the sixth switches are turned off so as to form one of a first discharging loop including the first winding, the first central tap, the first switch, the second body diode, the second central tap and the second winding and a second discharging loop including the second winding, the second central tap, the fourth switch, the first body diode, the first central tap and the first winding to release a stored electronic energy of the DBDL when a turn-on time of a burst mode is ended.

Preferably, the burst mode dimming circuit further includes a second switch, each of the primary winding and the first and the second switches includes a first and a second terminals, and the driver circuit is a full-bridge driver circuit including a third switch having a first terminal receiving the DC input voltage and a second terminal, a fourth switch having a first terminal coupled to the second terminal of the third switch and a second terminal coupled to the ground, a fifth switch having a first terminal receiving the DC input voltage and a second terminal and a sixth switch having a first terminal coupled to the second terminal of the fifth switch and a second terminal coupled to the ground.

Preferably, the fifth switch further includes a body diode, the burst mode dimming circuit further includes a resistor and a first capacitor each of which has a first and a second terminals, a diode has an anode and a cathode, the first terminal of the resistor receives the DC input voltage, the anode of the diode is coupled to the second terminal of the resistor, the first terminal of the first capacitor is coupled to the cathode of the diode, the second terminal of the first capacitor is coupled to the second terminal of the second switch and the first terminal of the fourth switch, the first terminal of the second switch is coupled to the first terminal of the primary winding and the second terminal of the first switch, the driver circuit further includes a second capacitor having a first and a second terminals, the first terminal of the second capacitor is coupled to the second terminal of the primary winding, the second terminal of the second capacitor is coupled to the first terminal of the sixth switch, the first to the third and the fifth switches are turned off and the fourth and the sixth switches are turned on such that the DC input voltage charges the first capacitor via the resistor, the diode and the fourth switch when the DBDL is starting, and subsequently the fourth and the sixth switches are turned off and the first to the third and the fifth switches are turned on such that the DC input voltage and the cross voltage of the first capacitor form the first driving voltage, the conducting path further includes the turned on third switch, the first and the second capacitors and the sixth switch, the first, the third and the sixth switches are turned off and the second, the fourth and the fifth switches are turned on when the DBDL is breaking through by the first driving voltage, and subsequently the two groups of switches formed by the first, the third and the sixth switches and the second, the fourth and the fifth switches are turned on and turned off alternately so as to generate the AC output voltage, and the first switch is turned on and the second to the sixth switches are turned off such that the first switch, the primary winding, the second capacitor, the body diode, the resistor and the diode form a discharging loop to release a stored electronic energy of the DBDL when a turn-on time of a dimming period is ended.

Preferably, the primary winding further includes a central tap, the burst mode dimming circuit further includes a diode having an anode and a cathode, the full-bridge driver circuit further includes a first capacitor having a first and a second terminals, the anode of the diode is coupled to the first terminal of the fourth switch and the second terminal of second switch, the first terminal of the first switch is coupled to the cathode of the diode, the second terminal of the first switch is coupled to the central tap of the primary winding, the first terminal of the second switch is coupled to the first terminal of the primary winding, the second terminal of the second switch is coupled to the anode of the diode, the first terminal of the capacitor is coupled to the second terminal of the primary winding, the second terminal of the capacitor is coupled to the first terminal of the sixth switch, the first, the third and the sixth switches are turned on and the second, the fourth and the fifth switches are turned off such that the first driving voltage is generated via a turns ratio of the primary and the secondary windings, and subsequently the first, the third and the sixth switches are turned off and the second, the fourth and the fifth switches are turned on when the DBDL is starting, the conducting path further includes the turned on third switch, the diode, the capacitor and the sixth switch, the first, the third and the sixth switches are turned off, the second, the fourth and the fifth switches are turned on when the DBDL is breaking through by the first driving voltage, and subsequently the two groups of switches formed by the first, the third and the sixth switches and the second, the fourth and the fifth switches are turned on and turned off alternately so as to generate the AC output voltage, and the first and the second switches are turned on and the third to the sixth switches are turned off such that the second switch, the diode, the first switch and the primary winding form a discharging loop to release a stored electronic energy of the DBDL when a turn-on time of a dimming period is ended.

Preferably, the fourth switch further includes a body diode, the primary winding further includes a central tap, the full-bridge driver circuit further includes a capacitor having a first and a second terminals, the first terminal of the first switch is coupled to the central tap, the second terminal of the first switch is coupled to the ground, the first terminal of the second switch is coupled to the first terminal of the sixth switch, the second terminal of the second switch is coupled to the second terminal of the primary winding, the first terminal of the capacitor is coupled to the first terminal of the fourth switch, the second terminal of the capacitor is coupled to the first terminal of the primary winding, the first and the third switches are turned on and the second and the fourth to the sixth switches are turned off such that the first driving voltage is generated via a turns ratio of the primary and the secondary windings when the DBDL is starting, the conducting path further includes the capacitor and the turned on third switch, the first and the third switches are turned off, and the second switch is turned on when the DBDL is breaking through by the first driving voltage, and subsequently the two groups of switches formed by the third and the sixth switches and the fourth and the fifth switches are turned on and turned off alternately so as to generate the AC output voltage, and the first switch is turned on and the second to the sixth switches are turned off such that the first switch, the body diode, the capacitor and the primary winding form a discharging loop to release a stored electronic energy of the DBDL when a turn-on time of a dimming period is ended.

Preferably, the third switch further includes a body diode, the primary winding further includes a central tap, the full-bridge driver circuit further includes a capacitor having a first and a second terminals, the first terminal of the first switch receives the DC input voltage, the second terminal of the first switch is coupled to the central tap, the first terminal of the second switch is coupled to the second terminal of the primary winding, the second terminal of the second switch is coupled to the first terminal of the sixth switch, the first terminal of the capacitor is coupled to the first terminal of the fourth switch, the second terminal of the capacitor is coupled to the first terminal of the primary winding, the first and the fourth switches are turned on and the second, the third, the fifth and the sixth switches are turned off such that the first driving voltage is generated via a turns ratio of the primary and the secondary windings when the DBDL is starting, the conducting path further includes the capacitor and the turned on fourth switch, the first and the fourth switches are turned off, and the second switch is turned on when the DBDL is breaking through by the first driving voltage, and subsequently the two groups of switches formed by the third and the sixth switches and the fourth and the fifth switches are turned on and turned off alternately so as to generate the AC output voltage, and the first switch is turned on and the second to the sixth switches are turned off such that the first switch, the primary winding, the capacitor and the body diode form a discharging loop to release a stored electronic energy of the DBDL when a turn-on time of a dimming period is ended.

According to the second aspect of the present invention, a DBDL system includes a transformer including a primary winding and a secondary winding, a DBDL coupled to the secondary winding and a burst mode dimming circuit including a first switch, wherein the first switch is turned on when the DBDL is starting such that a conducting path is formed by the primary winding and the first switch so as to apply a first driving voltage to the DBDEL.

Preferably, the transformer receives a DC input voltage for generating an AC output voltage, the first switch is turned off when the DBDL is breaking through by the first driving voltage so as to apply a second driving voltage to the DBDEL, the first driving voltage is a driving high voltage, and the second driving voltage is a driving normal voltage.

According to the third aspect of the present invention, a driving method for a DBDL system, wherein the system includes a driver circuit and a DBDL, includes the steps of: (a) lighting up the DBDL via the driver circuit; (b) providing a plurality of driving voltage pulses, each pulse having an amplitude of V to the DBDL and lasting for a first time period; (c) stopping a power supply of the DBDL for a second time period; (d) going to the step (b); and (e) modulating a ratio of the first and the second time periods to modulate a burst mode dimming for the DBDL, wherein there is a restarting time when it is transferring from step (d) to step (b), a pulse restarting voltage is provided to the DBDL during the restarting time, and an amplitude of the pulse restarting voltage is larger than V.

Preferably, the system further includes a burst mode dimming circuit (BMDC), the burst mode dimming is provided via the BMDC, the pulse restarting voltage is higher than 1.5V, V is a normal operating voltage of the DBDL, and the restarting time is less than 6 time periods of the driving voltage pulse.

The present invention may best be understood through the following descriptions with reference to the accompanying drawings, in which:

DETAILED DESCRIPTION OF THE PREFERRED EMBODIMENT

Figure 1:
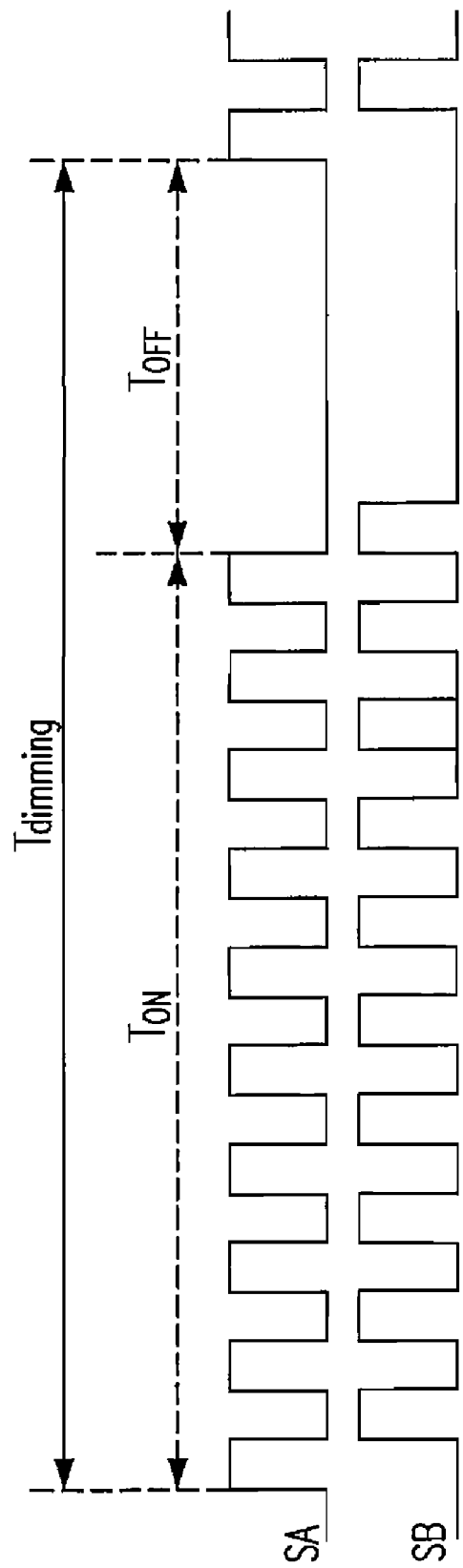
FIG. 1 shows a burst mode dimming method used by the FFL in the prior art.
Figure 2:
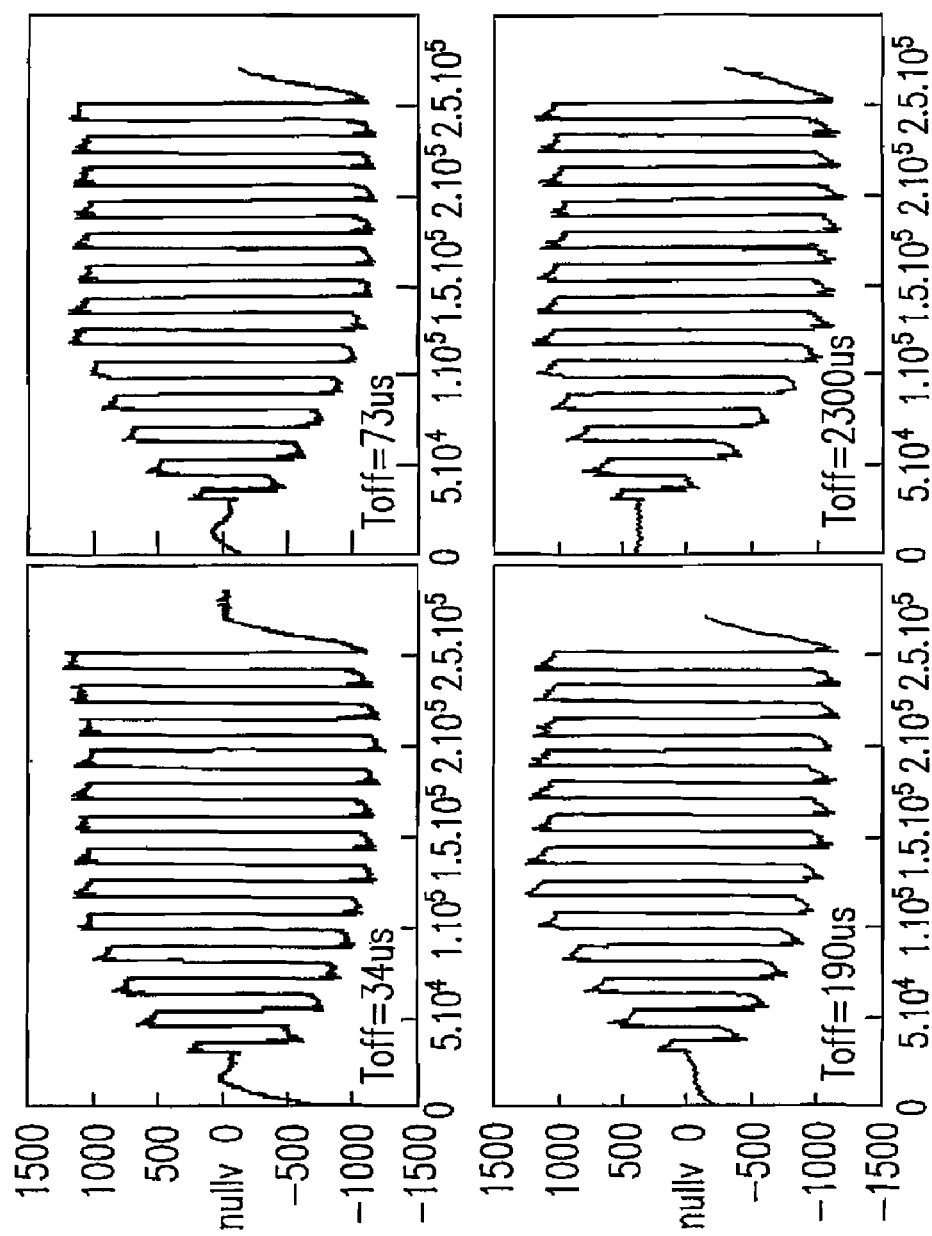
FIG. 2 shows a waveform diagram of the experimental values for verifying the light-up statuses having different off time.
Figure 3:
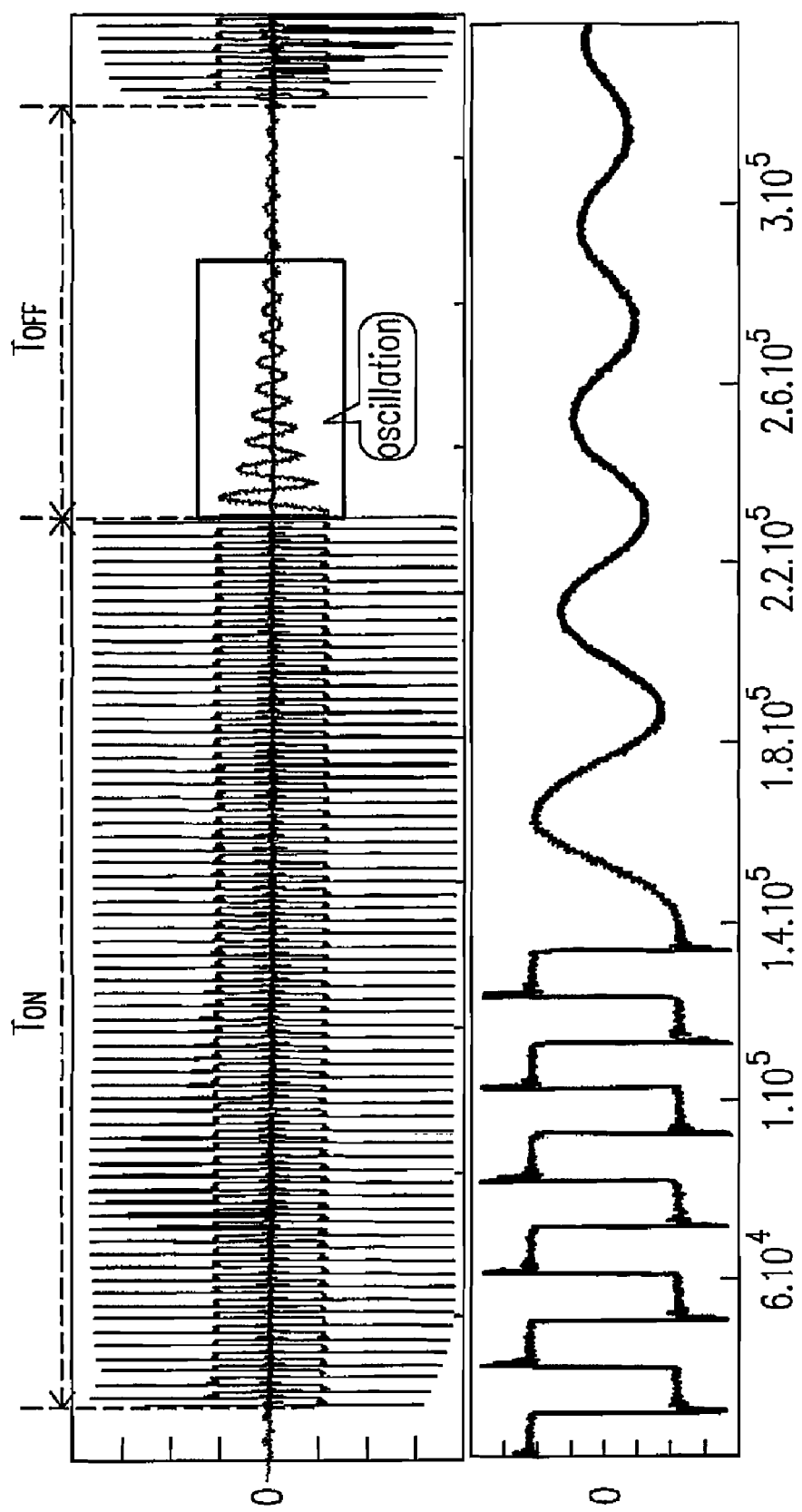
FIG. 3 shows a waveform diagram of the voltage oscillation phenomena during the off time when the burst mode dimming is employed by a conventional circuit.
Figure 4:
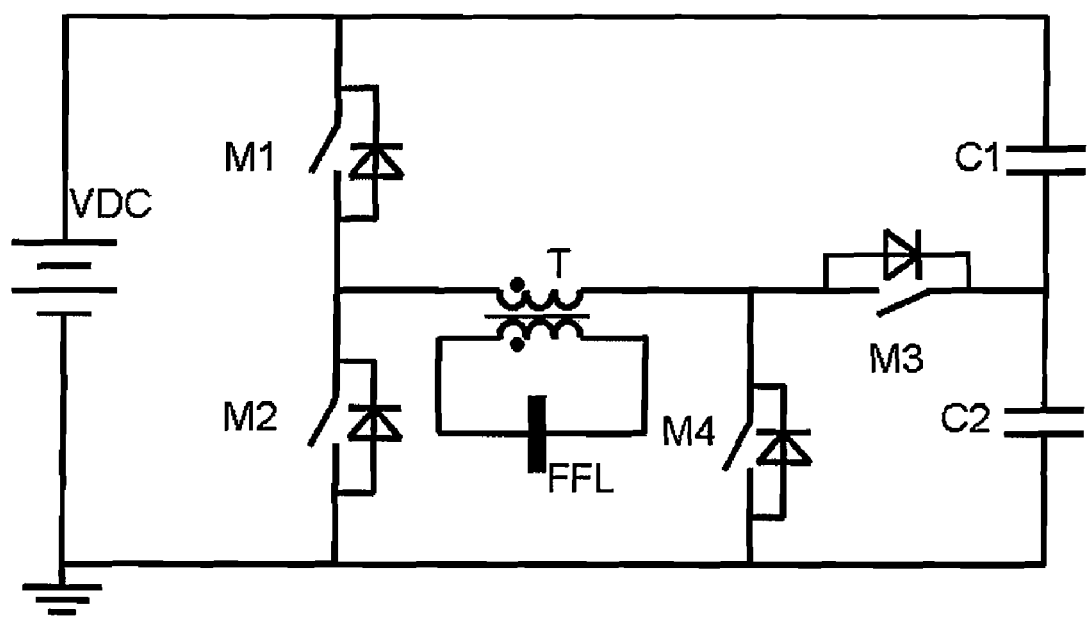
FIG. 4 shows a schematic circuit diagram of a FFL system according to the first preferred embodiment of the present invention.
Figure 5:
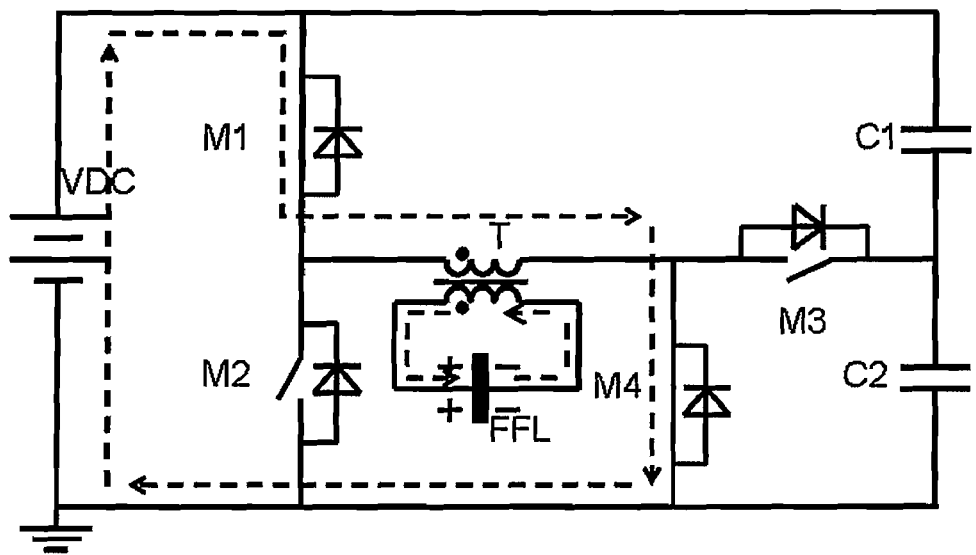
FIG. 5 shows a schematic circuit diagram of the timing sequence of switches and the current flowing direction of the first half driving-cycle of the startup operation of the FFL system according to the first preferred embodiment of the present invention.
Figure 6:
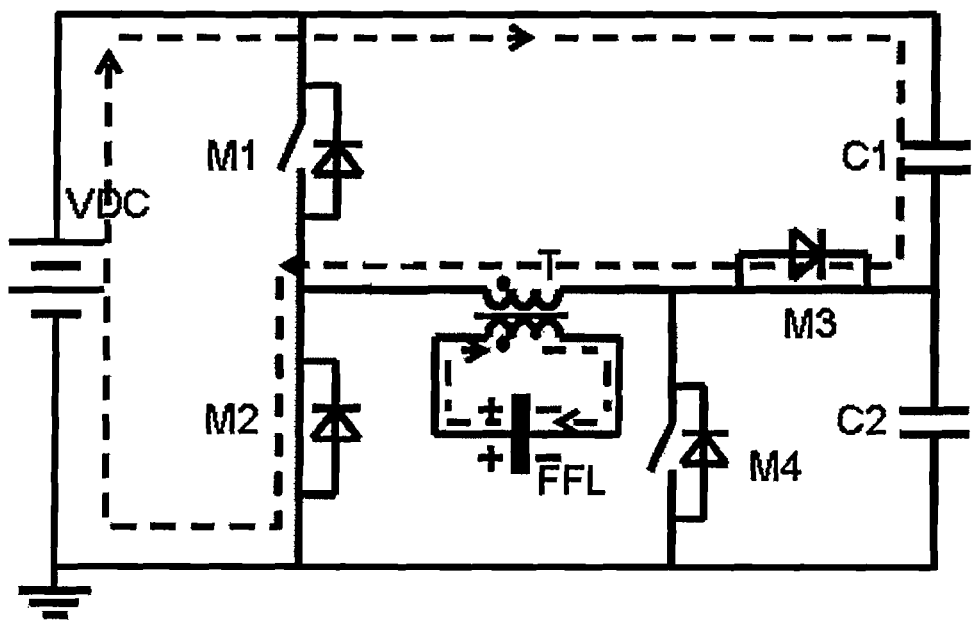
FIG. 6 is a schematic circuit diagram showing the first operational status of the FFL system after the first high voltage driving is ended according to the first preferred embodiment of the present invention.
Figure 7:
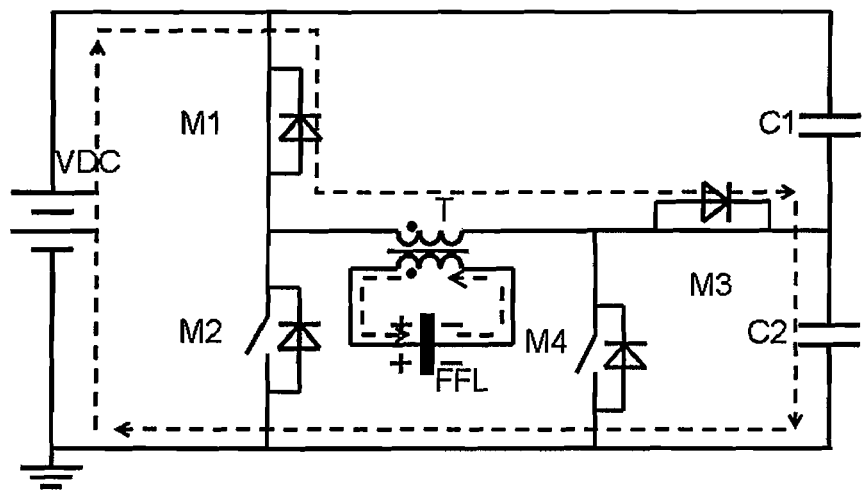
FIG. 7 is a schematic circuit diagram showing the second operational status of the FFL system after the first high voltage driving is ended according to the first preferred embodiment of the present invention.

FIG. 4 shows a schematic circuit diagram of a FFL system having a burst mode dimming circuit according to the first preferred embodiment of the present invention. It is a FFL system having a half-bridge driver circuit. In which, the burst mode dimming circuit includes the switches M3 and M4. The FFL system further includes a DC power source VDC, switches M1 and M2, a transformer T, a FFL and capacitors C1 and C2. FIG. 5 shows the startup operation of the burst mode dimming circuit according to the first preferred embodiment of the present invention. While starting, switches M1 and M4 are turned on, and the voltage across VDC is directed applied to the primary winding of the transformer T. At this moment, the voltage applies to the FFL is twice that of the normal operating voltage. Thus, the FFL could reach the totally lit up status within the time period of the first pulse, and then the switch M4 is turned off, the switch M3 is turned on, and the driver circuit becomes a conventional half-bridge driver circuit. FIGS. 6 and 7 show that after the FFL is totally lit up, the operations enter the first and the second statuses of the normal half-bridge driving respectively.

Figure 8:
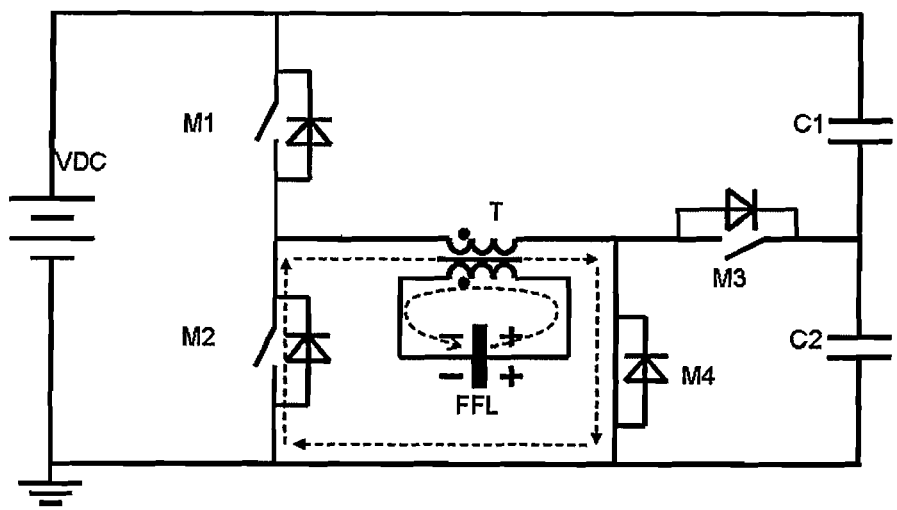
FIG. 8 is a schematic circuit diagram showing the statuses of switches and the current flowing directions of the FFL system when the turn-on time of the burst mode is ended according to the first preferred embodiment of the present invention.

FIG. 8 shows the last operation when the turn-on time of the burst mode is ended, the switch M3 is turned off firstly, and the switch M4 is turned on then. Switches M2 and M4, and the transformer T form a closed loop, and the energy stored in the FFL are mostly released. The remaining electrical charges form the remaining wall voltage in the FFL. The remain wall voltage does not appear as a voltage to the external, thus it will not form a stress to the transformer, and it will help a lot to the next light-up of the FFL.

Figure 9:
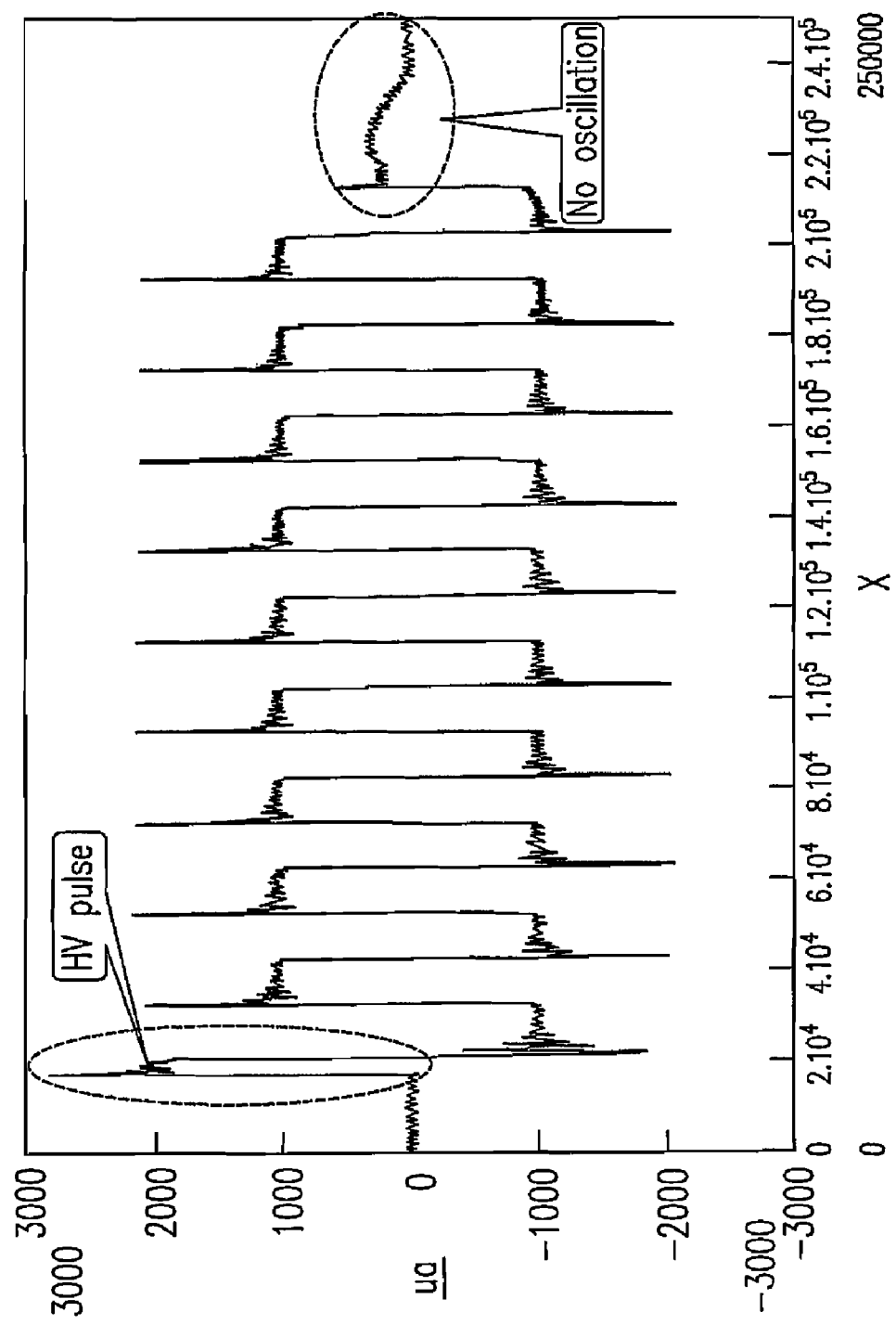
FIG. 9 shows a waveform diagram of the first driving voltage for dimming according to the first preferred embodiment of the present invention.

FIG. 9 displays the changing statuses of the first driving voltage (ua) of the FFL within the turn-on time of a dimming period. The first half cycle is the high voltage pulse driving, and it enters the normal half-bridge operating status since the second half-cycle. At the end of the on time, the FFL generates a self-discharging as shown in FIG. 8, which releases part of the energy stored in the FFL, and avoids the occurrence of the voltage oscillation.

Figure 10:
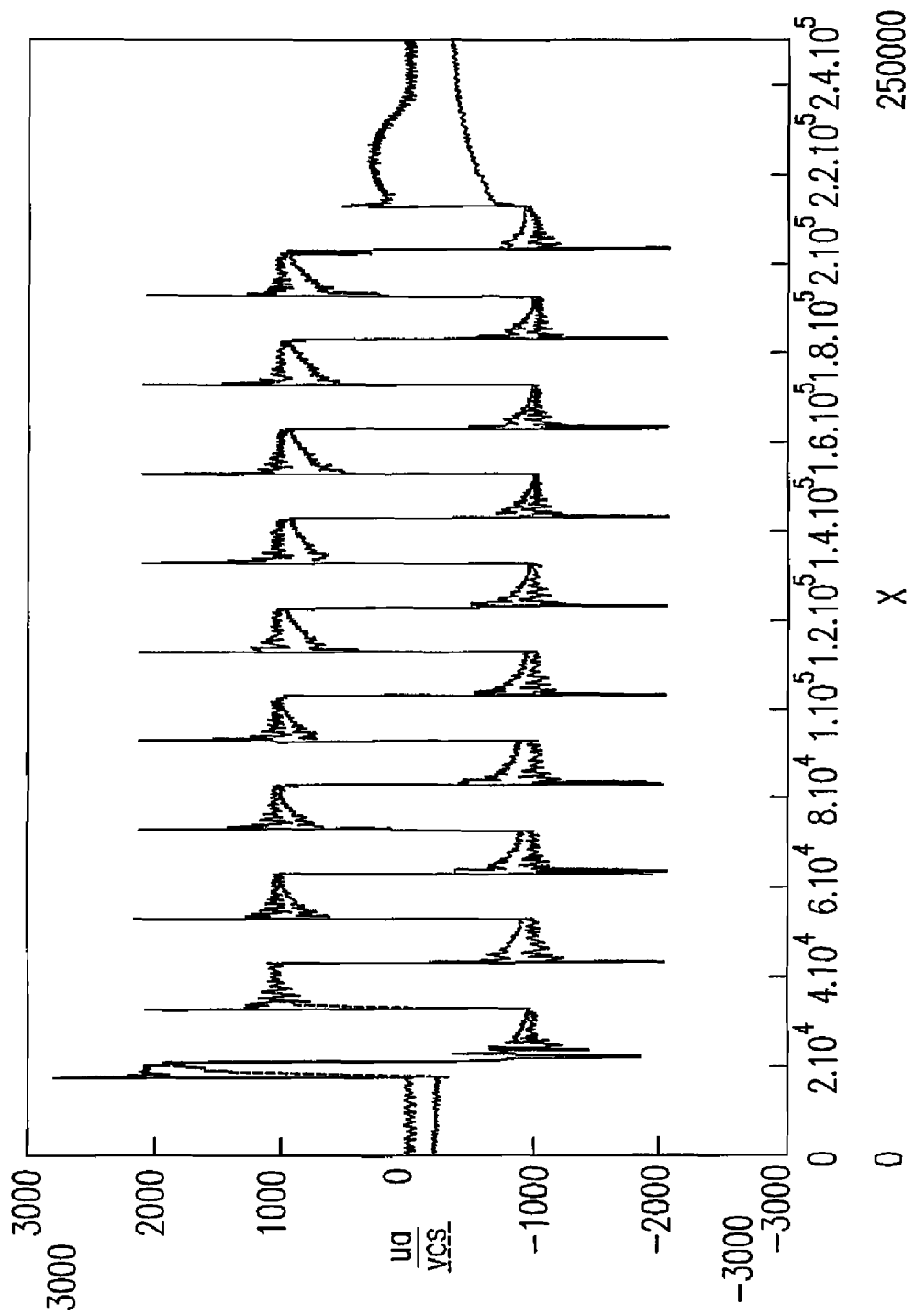
FIG. 10 is a waveform diagram showing the waveforms of the first driving voltage for dimming and the wall voltage in the lamp tube under the dimming status according to the first preferred embodiment of the present invention respectively.
Figure 11:
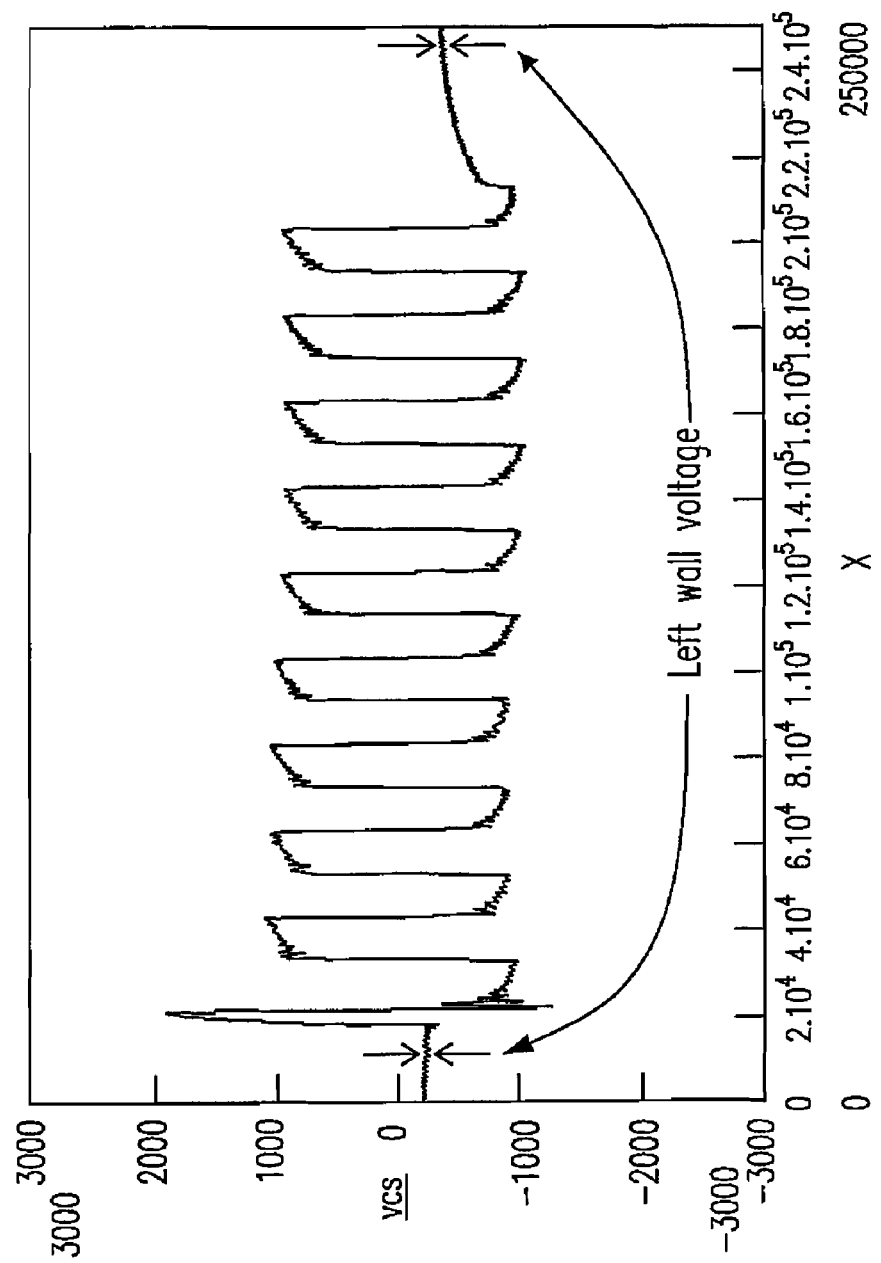
FIG. 11 is a waveform diagram showing the changing statuses of the wall voltage in the lamp tube before and after the driving according to the present invention respectively.

FIGS. 10 and 11 show the effects of the high voltage startup. Viewing from which, notice that the first high voltage pulse causes the FFL enters the totally lit up status, accomplishes the target of quick startup, and there still remain wall voltage (Vcs) existed after the on time is ended, which results in certain help to the next startup.

Figure 12:
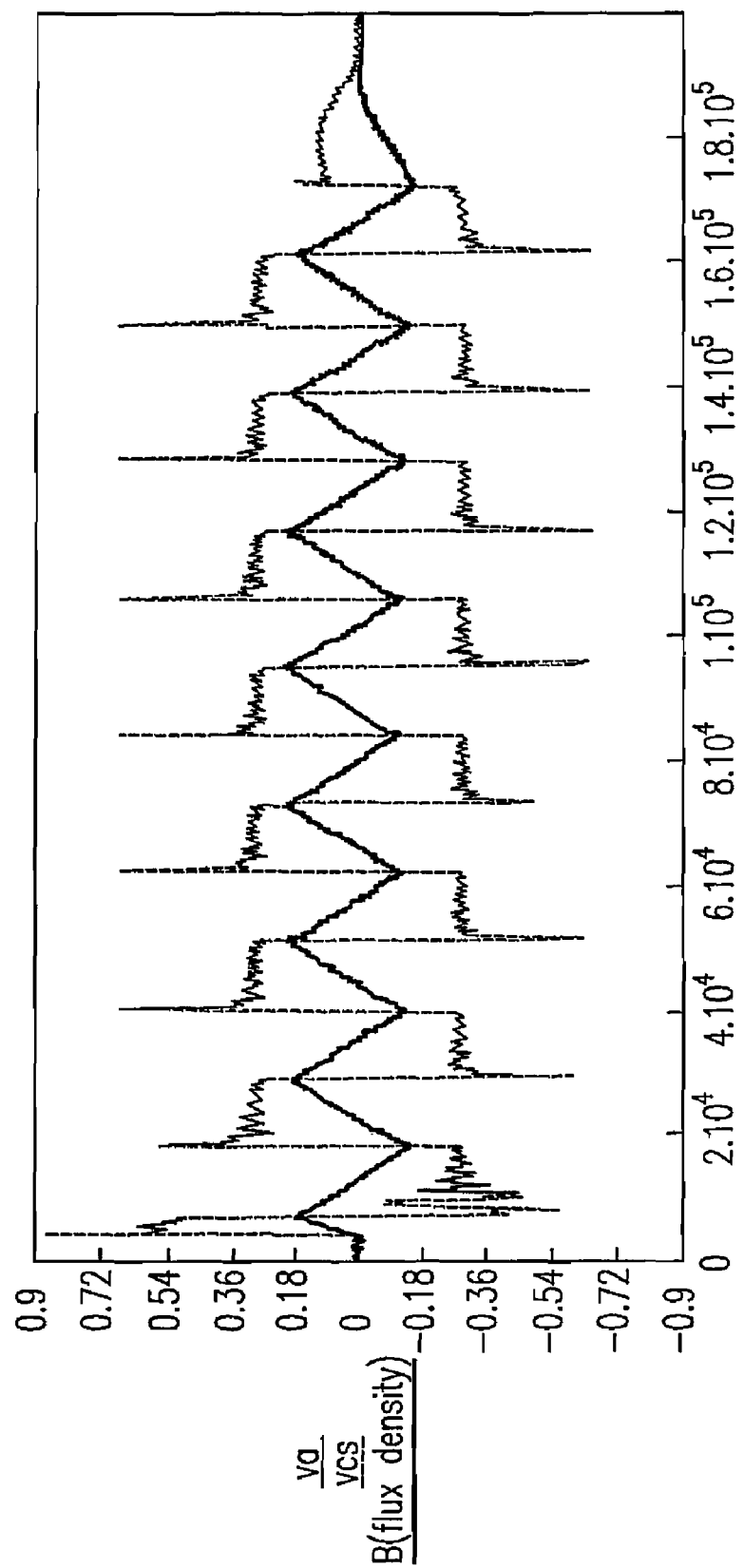
FIG. 12 is a waveform diagram showing the waveform of the first driving voltage and the changing statuses of the flux density in the transformer according to the present invention respectively.

FIG. 12 mainly displays a flux density curve of the transformer during a dimming period. Viewing from which, turning on switch M4 at the end of the on time causes the flux density curve of the transformer goes back to zero, which avoids the generation of the interference, and ensures the magnetic balance of the transformer. Considering from these aspects, the FFL system as shown in FIG. 4 has a relatively strong controllability.

Figure 13:
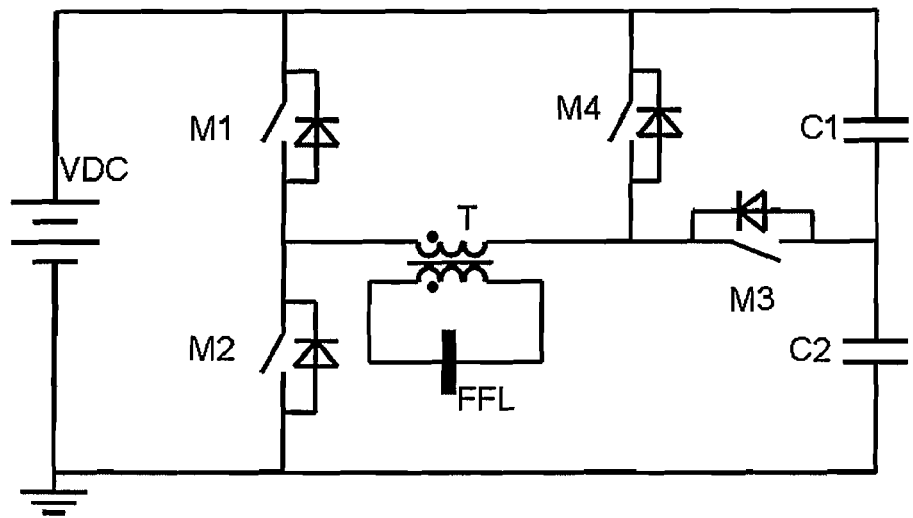
FIG. 13 shows a schematic circuit diagram of a FFL system according to the second preferred embodiment of the present invention.

FIG. 13 displays a schematic circuit diagram of a FFL system having a burst mode dimming circuit according to the second preferred embodiment of the present invention, and it is another FFL system having a half-bridge driver circuit. The burst mode dimming circuit also includes switches M3 and M4. While repeated starting in the burst mode, switches M2 and M4 are turned on firstly, and the transformer T is employed to generate a voltage higher than twice that of the driving voltage. After a period of time, switches M2 and M4 are turned off, switch M3 is turned on, and then switches M1 and M2 are turned on and turned off alternately to drive the FFL to work normally.

Figure 14:
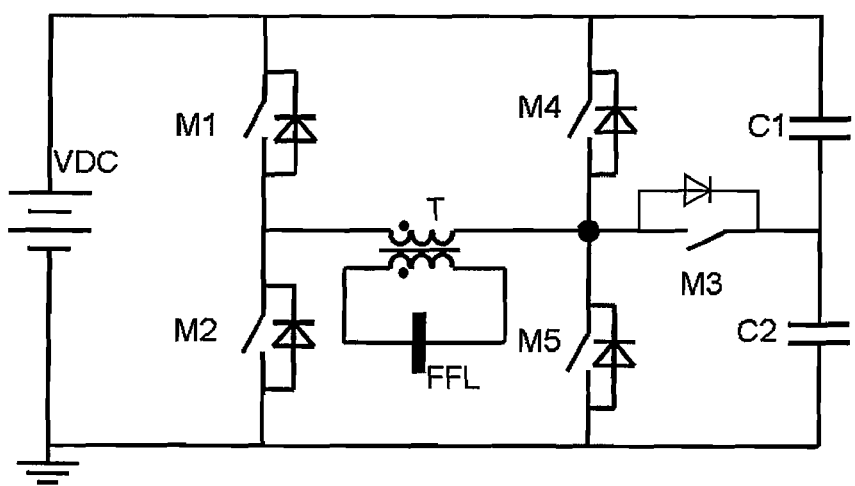
FIG. 14 shows a schematic circuit diagram of a FFL system according to the third preferred embodiment of the present invention.

As shown in FIG. 14, it shows a schematic circuit diagram of a FFL system having a burst mode dimming circuit according to the third preferred embodiment of the present invention, and it is a FFL system having a combination of a full-bridge and a half-bridge driver circuits. While starting in the burst mode, switches M1, M2, M4 and M5 are working under the full-bridge working mode, the transformer T is employed to generate a voltage higher than twice that of the driving voltage continuously, switches M4 and M5 are turned off after the FFL is breaking through, switch M3 is turned on, and then switches M1 and M2 are turned on and turned off alternately to drive the FFL to work normally.

Figure 15:
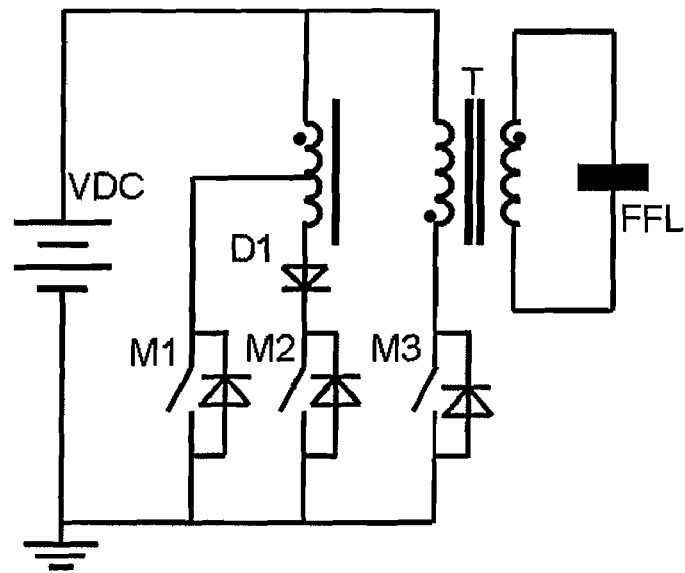
FIGS. 15-18 show schematic circuit diagrams of a FFL system according to the fourth to the seventh preferred embodiments of the present invention respectively.

As shown in FIG. 15, it shows a schematic circuit diagram of a FFL system having a burst mode dimming circuit according to the fourth preferred embodiment of the present invention, and it is a FFL system having a push-pull driver circuit with a diode D1. While starting in the burst mode, switch M1 is turned on firstly, a high voltage is generated employing the turns ratio of the central tap winding and the secondary winding of the transformer T, switch M1 is turned off then, and after that switches M2 and M3 are employed to be turned on and turned off alternately to drive the FFL to work normally.

Figure 16:
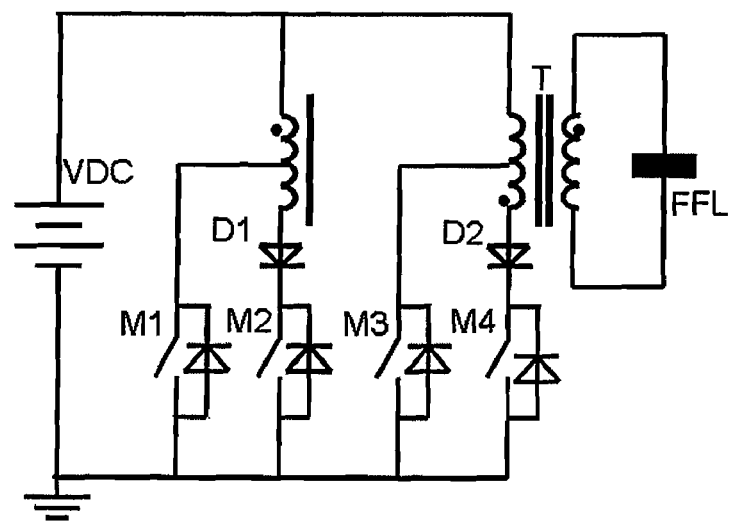

As shown in FIG. 16, it shows a schematic circuit diagram of a FFL system having a burst mode dimming circuit according to the fifth preferred embodiment of the present invention, and it is a FFL system having a push-pull driver circuit with diodes D1 and D2. While starting in the burst mode, switches M1 and M3 are turned on and turned off alternately firstly, a high voltage is continuously generated using the turns ratio of the central tap winding and the secondary winding of the transformer T, switches M1 and M3 are turned off after the FFL is breaking through, and then changing to that switches M2 and M4 are turned on and turned off alternately to drive the FFL to work normally.

Figure 17:
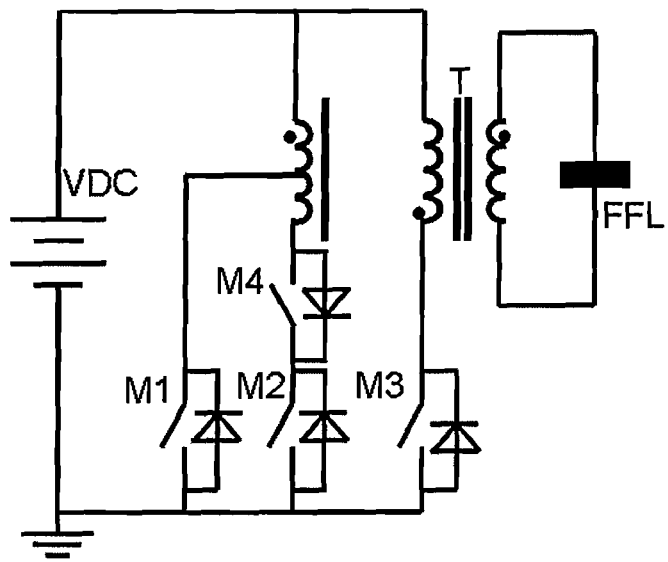

As shown in FIG. 17, it shows a schematic circuit diagram of a FFL system having a burst mode dimming circuit according to the sixth preferred embodiment of the present invention, and it is a FFL system having a push-pull driver circuit. The operational principles of the FFL system as shown in FIG. 17 and the FFL system as shown in FIG. 15 are similar, and the difference is that the diode D1 in FIG. 15 is replaced by a switch M4 in FIG. 17.

Figure 18:
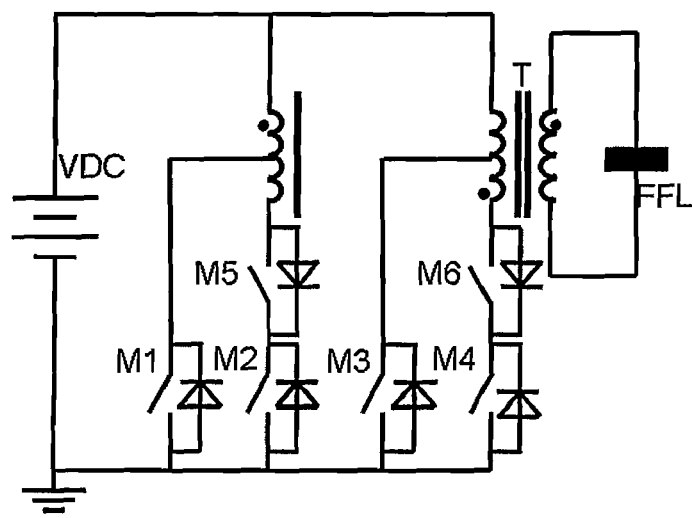

As shown in FIG. 18, it shows a schematic circuit diagram of a FFL system having a burst mode dimming circuit according to the seventh preferred embodiment of the present invention, and it is a FFL system having a push-pull driver circuit. The operational principles of the FFL system as shown in FIG. 18 and the FFL system as shown in FIG. 16 are similar, and the difference between these two is that the diodes D1 and D2 in FIG. 16 are replaced by two switches M5 and M6 in FIG. 18.

Figure 19:
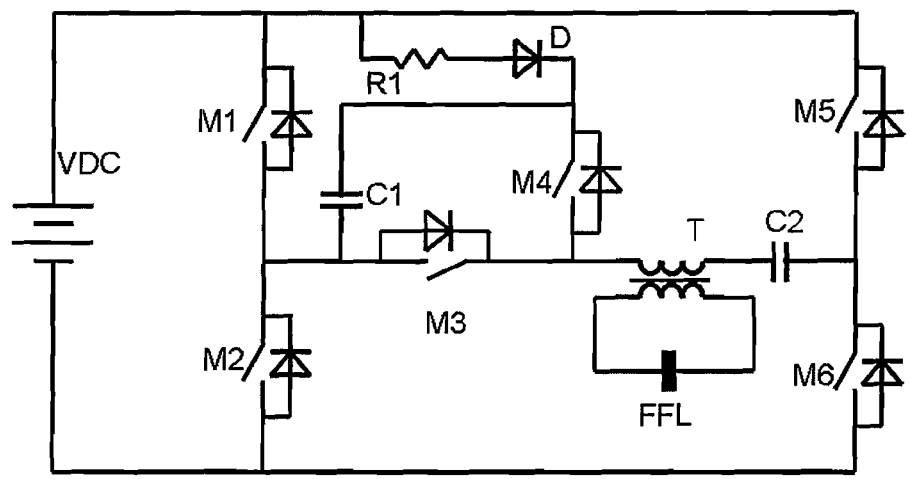
FIGS. 19-24 show schematic circuit diagrams of a FFL system according to the eighth to the thirteenth preferred embodiments of the present invention respectively.

As shown in FIG. 19, it shows a schematic circuit diagram of a FFL system having a burst mode dimming circuit according to the eighth preferred embodiment of the present invention, and it is a FFL system having a full-bridge driver circuit. While starting in the burst mode, switches M1, M3, M4 and M5 are turned off firstly, switches M2 and M6 are turned on such that a capacitor C1 is charged via a diode D, a resistor R1 and the switch M2. The driver circuit further includes the DC power source VDC, a capacitor C2, the FFL and the transformer T. Switches M2 and M6 are turned off when the charging of C1 is ended, and switches M1, M4 and M6 are turned on such that the voltage across the VDC and the voltage across C1 commonly apply to the primary winding of the transformer T to generate a high voltage. After that, switches M1, M4 and M6 are turned off, switches M2, M3 and M5 are turned on, and then it goes into the normal operational status.

Figure 20:
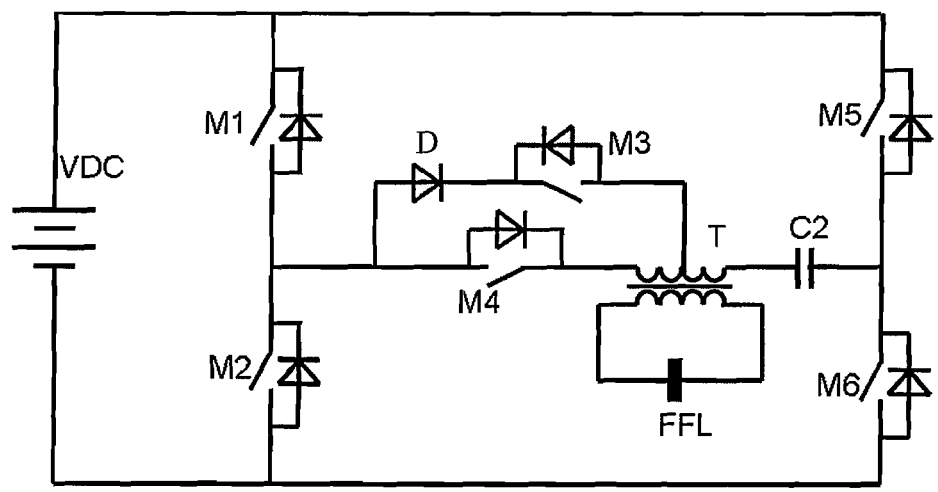

As shown in FIG. 20, it shows a schematic circuit diagram of a FFL system having a burst mode dimming circuit according to the ninth preferred embodiment of the present invention, and it is a FFL system having a full-bridge driver circuit. While in the stage of starting the high voltage of the burst mode, switches M1, M3 and M6 are turned on such that a high voltage is generated employing the turns ratio of the central tap winding and the secondary winding of a transformer T, switches M1, M3 and M6 are turned off after that, switches M2, M4 and M5 are turned on, and then it goes into the normal operational status. The driver circuit further includes the DC power source VDC, the diode D, the capacitor C2 and the FFL.

Figure 21:
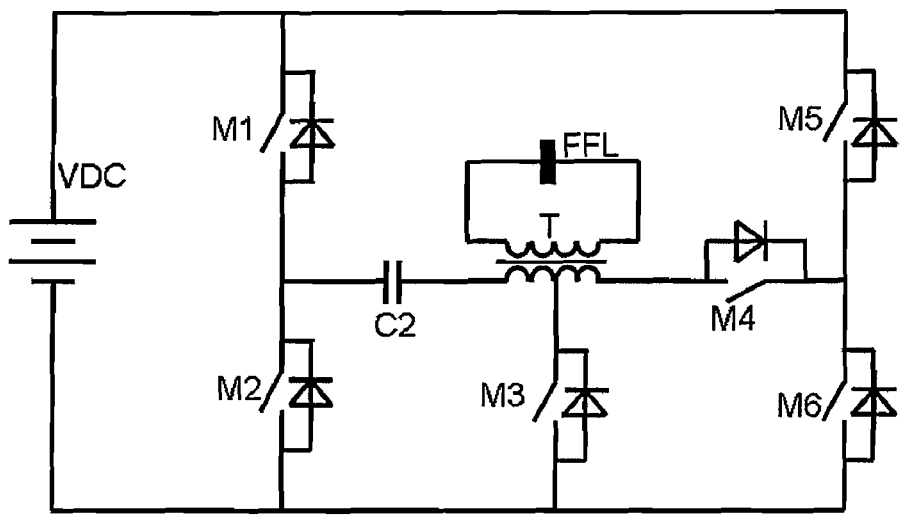

As shown in FIG. 21, it shows a schematic circuit diagram of a FFL system having a burst mode dimming circuit according to the tenth preferred embodiment of the present invention, and it is a FFL system having a full-bridge driver circuit. There is a central tap of the primary winding of the transformer T, and the switch M3 (a MOSFET) is electrically connected to a ground. While starting in the burst mode, switches M1 and M3 are turned on, and switches M2, M4, M5 and M6 are turned off. A high voltage is generated employing the turns ratio of the central tap winding and the secondary winding of the transformer T, switches M1 and M3 are turned off after that, and the switch M4 is turned on. And then two groups of switches formed by M1 and M6, and M2 and M5 are turned on and turned off alternately to drive the FFL to work normally. The driver circuit further includes the DC power source VDC, a capacitor C2 and the FFL.

Figure 22:
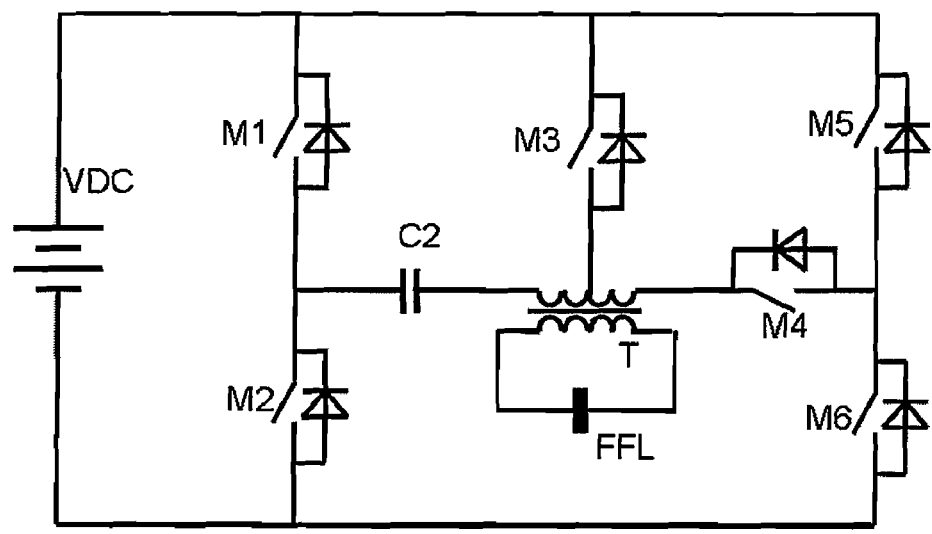

As shown in FIG. 22, it shows a schematic circuit diagram of a FFL system having a burst mode dimming circuit according to the eleventh preferred embodiment of the present invention, and it is also a FFL system having a full-bridge driver circuit. There is a central tap of the primary winding of the transformer T, and the MOSFET M3 is electrically connected to the DC power source VDC. While starting in the burst mode, switches M2 and M3 are turned on, and switches M1, M4, M5 and M6 are turned off. A high voltage is generated employing the turns ratio of the central tap winding and the secondary winding of the transformer T, switches M2 and M3 are turned off after that, and the switch M4 is turned on. And then two groups of switches formed by M1 and M6, and M2 and M5 are turned on and turned off alternately to drive the FFL to work normally. The driver circuit further includes the capacitor C2 and the FFL.

Figure 23:
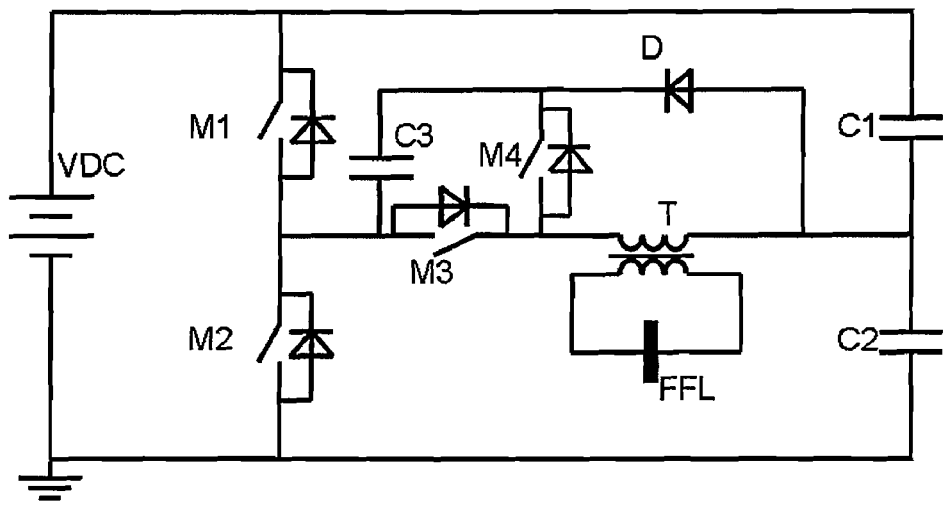

As shown in FIG. 23, it shows a schematic circuit diagram of a FFL system having a burst mode dimming circuit according to the twelfth preferred embodiment of the present invention, and it is a FFL system having a half-bridge driver circuit. While starting in the burst mode, the switch M2 is turned on, and a capacitor C3 is charged by a middle point potential of capacitors C1 and C2 via the diode D and the switch M2. And then switches M1 and M4 are turned on, switches M2 and M3 are turned off, the DC input voltage across VDC and the voltage across C3 commonly apply to the primary winding of the transformer T, and a high voltage for quick startup is finally generated. Switches M1 and M4 are turned off and switches M2 and M3 are turned on after that, and then switches M1 and M2 are turned on and turned off alternately to enter a normal half-bridge operating status. The driver circuit further includes the FFL.

Figure 24:
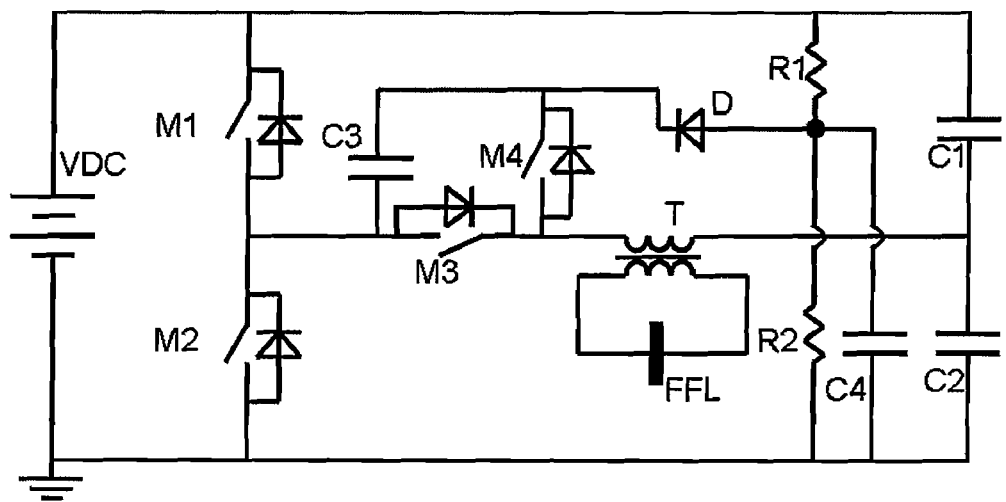

As shown in FIG. 24, it shows a schematic circuit diagram of a FFL system having a burst mode dimming circuit according to the thirteenth preferred embodiment of the present invention, and it is also a FFL system having a half-bridge driver circuit. While starting in the burst mode, the switch M2 is turned on, and the capacitor C3 is charged by the voltage across the DC power source VDC via the resistor R1, the diode D and the switch M2. Switches M1 and M4 are turned on and switches M2 and M3 are turned off such that the DC input voltage across VDC and the voltage across the capacitor C3 commonly apply to the primary winding of the transformer T so as to generate a high voltage for a quick startup. Switches M1 and M4 are turned off and switches M2 and M3 are turned on right after that, and then switches M1 and M2 are turned on and turned off alternately to enter the normal half-bridge operating status. The driver circuit further includes capacitors C1, C2 and C4, a resistor R2 and the. FFL.

From the above-mentioned descriptions, the provided DBDL system and the driving method thereof have a relatively better performance, and reduce the startup time. In the present invention, a method of increasing the starting voltage is employed to accomplish the quick startup. The detail method of increasing the startup speed is to increase the driving voltage applied to the DBDL such that the DBDL is quickly breaking through and enters the totally lit up status. And then, restore the external driving voltage of the DBDL in normal status. Being verified, this method is quite effective to the quick startup of the DBDL, the effects are more obvious especially during the dimming process, and could dramatically improve the blinking light problem under the relatively lower dimming value of the DBDL. The present invention elaborates a method of employing a pulse or several pulses higher than the normal operating voltage during the startup so as to decrease the blinking light problem in burst mode dimming solution and the correspond circuits to supply high driving pulse voltage during the DBDL startup stage.

While the invention has been described in terms of what are presently considered to be the most practical and preferred embodiments, it is to be understood that the invention should not be limited to the disclosed embodiment. Otherwise, it is intended to cover various modifications and similar arrangements included within the spirit and scope of the appended claims, which are to be accorded with the broadest interpretation so as to encompass all such modifications and similar structures. Therefore, the above description and illustration should not limit the scope of the present invention which is defined by the appended claims.

What is claimed is:

1. A driving method for a dielectric barrier discharge lamp (DBDL) system, wherein the system comprises a driver circuit and a DBDL, the driver circuit receives a DC input voltage for generating an AC output voltage and comprises a transformer having a primary winding and a secondary winding, the DBDL is connected to the secondary winding, and the DBDL system further comprises a burst mode dimming circuit (BMDC) having a first switch connected to the primary winding, comprising the steps of:

(a) lighting up the DBDL via the driver circuit;

(b) providing a plurality of driving voltage pulses, each pulse having an amplitude of V, to the DBDL and lasting for a first time period;

(c) stopping a power supply of the DBDL for a second time period; and (d) going to the step (b)

wherein there is a restarting time when it is transferring from step (d) to step (b), a pulse restarting voltage is provided to the DBDL during the restarting time, and an amplitude of the pulse restarting voltage is larger than V;

wherein during the restarting time, the first switch is turned on when the DBDL is starting such that a conducting path is formed by the primary winding and the first switch so as to apply the pulse restarting voltage to the DBDL, the first switch is turned off when the DBDL is breaking through by the pulse restarting voltage so as to apply the driving voltage pulses to the DBDL; and wherein near the end of a turn-on time of a burst mode, the first switch is turned on to release an energy stored in the DBDL to diminish an oscillation.

2. A method according to claim 1, wherein the burst mode dimming is provided via the BMDC, the pulse restarting voltage is higher than 1.5V, V is a normal operating voltage of the DBDL, and the restarting time is less than 6 time periods of the driving voltage pulse.

3. A method according to claim 1, wherein the burst mode dimming circuit further comprises a second switch, and the driver circuit is a half-bridge driver circuit, comprising:
a third switch having a first terminal receiving the DC input voltage and a second terminal;
a fourth switch having a first terminal coupled to the second terminal of the third switch and a second terminal coupled to a ground;
a first capacitor having a first terminal coupled to the first terminal of the third switch and a second terminal; and
a second capacitor having a first terminal coupled to the second terminal of the first capacitor and a second terminal coupled to the ground.

4. A method according to claim 3, wherein each of the primary winding and the first and the second switches comprises a first and a second terminals, the fourth switch further comprises a body diode, the first terminal of the fourth switch is coupled to the first terminal of the primary winding, the second terminal of the second switch is coupled to the first terminal of the first switch and the second terminal of the primary winding, the second terminal of the first capacitor is coupled to the first terminal of the second switch, the conducting path further comprises the turned on third switch, the first and the third switches are turned off and the second switch is turned on when the DBDL is breaking through by the pulse restarting voltage, and subsequently the third and the fourth switches are turned on and turned off alternately so as to generate the AC output voltage, and the first switch is turned on and the second to the fourth switches are turned off such that the first switch, the primary winding and the body diode form a discharging loop to release a stored electronic energy of the DBDL when a turn-on time of a dimming period is ended.

5. A method according to claim 3, wherein each of the primary winding and the first and the second switches comprises a first and a second terminals, the third switch further comprises a body diode, the first terminal of the fourth switch is coupled to the first terminal of the primary winding, the first terminal of the second switch is coupled to the second terminal of the first switch and the second terminal of the primary winding, the second terminal of the first capacitor is coupled to the second terminal of the second switch, the conducting path further comprises the turned on fourth switch, the first and the fourth switches are turned off and the second switch is turned on when the DBDL is breaking through by the pulse restarting voltage, and subsequently the third and the fourth switches are turned on and turned off alternately so as to generate the AC output voltage, and the first switch is turned on and the second to the fourth switches are turned off such that the first switch, the primary winding and the body diode form a discharging loop to release a stored electronic energy of the DBDL when a turn-on time of a dimming period is ended.

6. A method according to claim 3, wherein each of the primary winding and the first and the second switches comprises a first and a second terminals, the fourth switch further comprises a body diode, the first terminal of the fourth switch is coupled to the first terminal of the primary winding, the burst mode dimming circuit further comprises a fifth switch having a first and a second terminals, the second terminal of the second switch is coupled to the first terminal of the first switch, the second terminal of the fifth switch and the second terminal of the primary winding, the second terminal of the first capacitor is coupled to the first terminal of the second switch, the conducting path further comprises the turned on third switch, the first and the fifth switches are turned off and the second switch is turned on when the DBDL is breaking through by the pulse restarting voltage, and subsequently the two groups of switches formed by the first and the third switches and the fourth and the fifth switches are turned on and turned off alternately so as to generate the AC output voltage, and the first switch is turned on and the second to the fifth switches are turned off such that the first switch, the primary winding and the body diode form a discharging loop to release a stored electronic energy of the DBDL when a turn-on time of a dimming period is ended.

7. A method according to claim 3, wherein the burst mode dimming circuit further comprises a diode having an anode and a cathode and a third capacitor, each of the primary winding, the first and the second switches and the third capacitor comprises a first and a second terminals, the anode of the diode is coupled to the first terminal of the second capacitor, the cathode of the diode is coupled to the first terminal of the third capacitor and the first terminal of the first switch, the second terminal of the third capacitor is coupled to the first terminal of the fourth switch and the second terminal of the second switch, the first terminal of the second switch is coupled to the second terminal of the first switch and the first terminal of the primary winding, the second terminal of the first capacitor is coupled to the second terminal of the primary winding, the fourth switch is turned on and the first to the third switches are turned off when the DBDL is starting such that a middle point potential of the first and the second capacitors charges the third capacitor via the diode and the fourth switch, and subsequently the first and the third switches are turned on and the second and the fourth switches are turned off such that the DC input voltage and a cross voltage of the third capacitor form the pulse restarting voltage, the conducting path further comprises the turned on third switch and the second and the third capacitors, the first and the third switches are turned off and the second and the fourth switches are turned on when the DBDL is breaking through by the pulse restarting voltage, and subsequently the third and the fourth switches are turned on and turned off alternately so as to generate the AC output voltage, and the first switch is turned on and the second to the fourth switches are turned off such that the first switch, the primary winding and the diode form a discharging loop to release a stored electronic energy of the DBDL when a turn-on time of a dimming period is ended.

8. A method according to claim 3, wherein the burst mode dimming circuit further comprises a first and a second resistors, a diode has an anode and a cathode and a third and a fourth capacitors, each of the primary winding, the first and the second switches, the first and the second resistors and the third and the fourth capacitors comprises a first and a second terminals, the first terminal of the first resistor is coupled to the first terminal of the first capacitor, the anode of the diode is coupled to the second terminal of the first resistor, the first terminal of the second resistor and the first terminal of the fourth capacitor, the second terminal of the second resistor and the second terminal of the fourth capacitor are coupled to the second terminal of the second capacitor, the cathode of the diode is coupled to the first terminal of the third capacitor and the first terminal of the first switch, the second terminal of the third capacitor is coupled to the first terminal of the fourth switch and the second terminal of the second switch, the first terminal of the second switch is coupled to the second terminal of the first switch and the first terminal of the primary winding, the second terminal of the first capacitor is coupled to the second terminal of the primary winding, the fourth switch is turned on and the first to the third switches are turned off when the DBDL is starting such that the DC input voltage charges the third capacitor via the first resistor, the diode and the fourth switch, and subsequently the first and the third switches are turned on and the second and the fourth switches are turned off such that the DC input voltage and a cross voltage of the third capacitor form the pulse restarting voltage, the conducting path further comprises the turned on third switch and the second and the third capacitors, the first and the third switches are turned off and the second and the fourth switches are turned on when the DBDL is breaking through by the pulse restarting voltage, and subsequently the third and the fourth switches are turned on and turned off alternately so as to generate the AC output voltage, and the first switch is turned on and the second to the fourth switches are turned off such that the first switch, the primary winding, the first capacitor, the first resistor and the diode form a discharging loop to release a stored electronic energy of the DBDL when a turn-on time of a dimming period is ended.

* * * * *